United States Patent [19]

Griswold et al.

[11] Patent Number: 4,771,901
[45] Date of Patent: Sep. 20, 1988

[54] MOBILE SHELVING CARRIAGE

[75] Inventors: Kenneth D. Griswold, Muskegon; Alan R. Leist, North Muskegon, both of Mich.

[73] Assignee: Pipp Mobile Systems, Inc., Grand Rapids, Mich.

[21] Appl. No.: 4,326

[22] Filed: Jan. 15, 1987

[51] Int. Cl.⁴ .................................................. A47F 5/00
[52] U.S. Cl. .................................... 211/151; 211/162; 301/112; 312/250; 16/18 R
[58] Field of Search ............... 211/151, 162; 248/129; 301/1, 5 R, 114, 120, 112; 16/31 R, 40, 18 R, 29; 180/79.1 R, 11.22, 11.23; 312/201, 341 R, 250; 108/143, 137, 102; 105/180, 238.1, 413, 396

[56] References Cited

U.S. PATENT DOCUMENTS

| | | | |
|---|---|---|---|
| 534,897 | 2/1895 | Liddell | 301/112 |
| 584,654 | 6/1897 | Skornicki | 280/11.23 |
| 2,166,704 | 7/1939 | Foulkes . | |
| 2,915,195 | 12/1959 | Crosby . | |
| 3,427,085 | 2/1969 | Staller . | |
| 3,535,009 | 10/1970 | Cain . | |
| 3,640,595 | 2/1972 | Staller et al. . | |
| 3,801,176 | 4/1974 | Higbee . | |
| 3,923,354 | 12/1975 | Young . | |
| 3,967,868 | 7/1976 | Baker, Jr. . | |
| 4,050,828 | 9/1977 | Noro | 256/65 X |
| 4,417,524 | 11/1983 | Quinn et al. . | |
| 4,421,365 | 12/1983 | Taniwaki | 105/413 X |
| 4,467,924 | 8/1984 | Morcheles . | |
| 4,597,615 | 7/1986 | Steger . | |

Primary Examiner—Ramon S. Britts
Assistant Examiner—Blair M. Johnson
Attorney, Agent, or Firm—Price, Heneveld, Cooper, DeWitt & Litton

[57] ABSTRACT

The specification discloses a simple, yet extremely strong and serviceable, mobile shelving carriage construction. A first extruded frame member defines integral screw bosses within its cross-sectional shape. A second frame member is secured to the first frame member by screws secured within the integral bosses. A roller axle is mounted in the first frame member and includes a circumferential groove aligned with one of the screw bosses. The securement screws interfit with the axle groove to retain the axle within the first frame member.

8 Claims, 2 Drawing Sheets

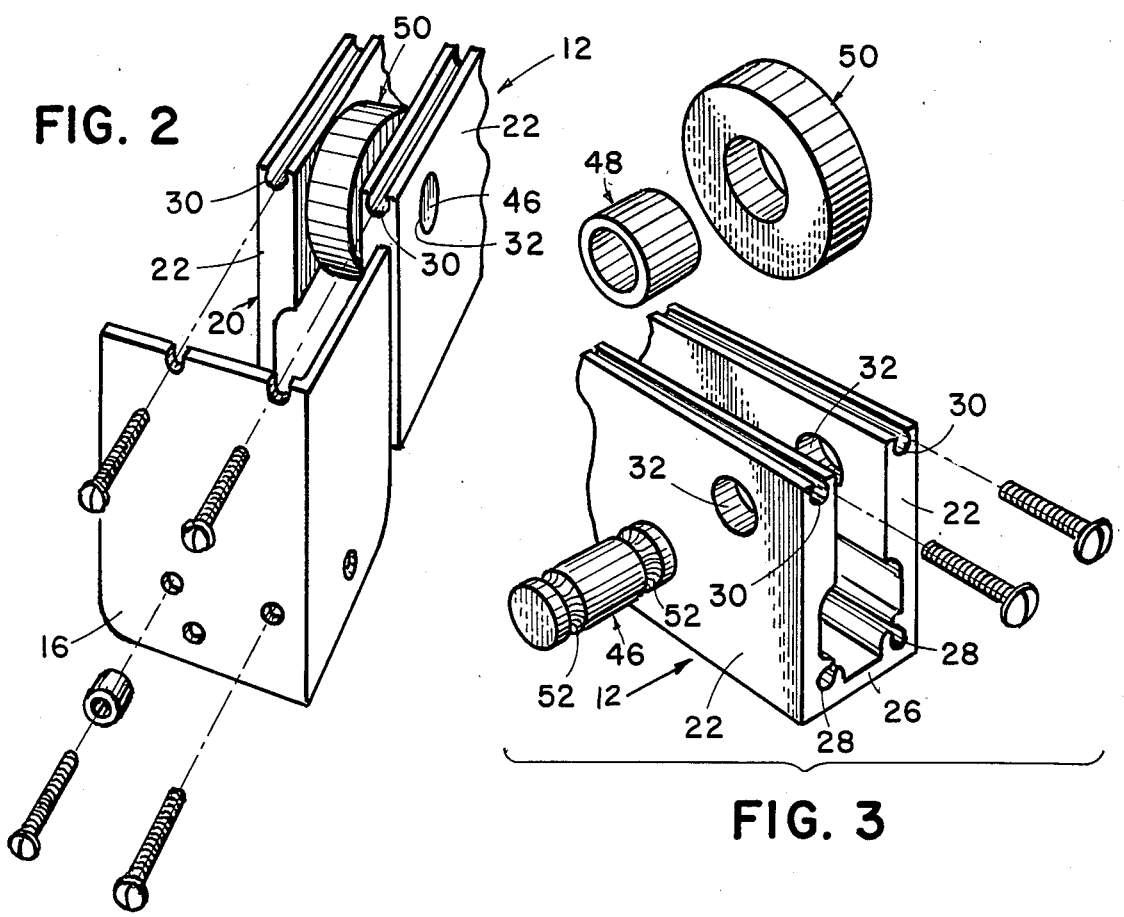
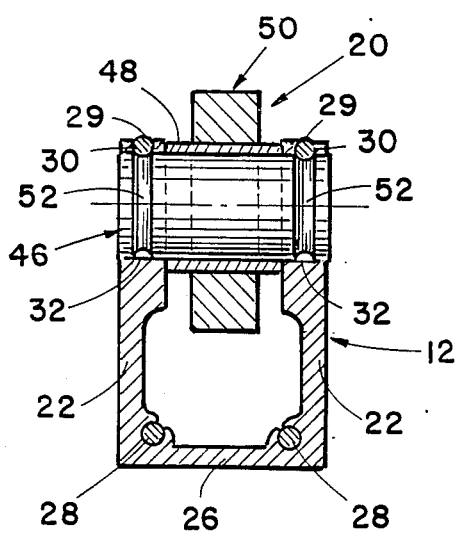
FIG. 2
FIG. 3
FIG. 4
FIG. 5

MOBILE SHELVING CARRIAGE

BACKGROUND OF THE INVENTION

The present invention relates to mobile shelving, and more particularly to carriages for supporting shelving units for movement along tracks.

A wide variety of mobile shelving has been developed to provide high density, yet easily accessible, storage. Such systems include a plurality of shelving units supported on carriages which travel along tracks mounted on the floor. Typically, all but two of the shelving units abut one another. The two shelving units which are spaced from one another define an aisle providing access to items stored in the shelving units. One or more of the shelving units can be moved at a time to define the aisle between the desired shelving units.

Often, mobile shelving units are heavily loaded, for example with books or files, and accordingly must bear large loads. The carriages which carry the shelving units must be extremely strong to withstand both the weight of the units and the forces required to move the loaded shelving units. The need for such strength has resulted in carriage constructions which are excessively complicated, increasing costs and decreasing serviceability.

SUMMARY OF THE INVENTION

The aforementioned problems are overcome in the present invention comprising a mobile shelving carriage of extremely simple, yet strong construction. The carriage includes a plurality of extruded frame members which define integral screw bosses. The various frame members can be easily and securely interconnected by anchoring screws directly within the integral screw bosses. The carriage frame is constructed primarily of the extruded frame members and screws in an extremely efficient and serviceable construction.

Preferably, the axle supporting the rollers on which the carriage rides is also held in place by the same screws. More particularly, each axle extends through a frame member and includes a circumferential groove, or other void, aligned with the screw bosses. The screws therefore cooperate with the groove in the axle to retain the axle in position without additional securement or alignment structure.

These and other objects, advantages, and features of the invention will be more readily understood and appreciated by reference to the detailed description of the preferred embodiment and the drawings.

BRIEF DESCRIPTION OF THE DRAWINGS

FIG. 2 is a fragmentary perspective view, partially exploded, of the inverted corner construction;

FIG. 3 is a fragmentary perspective exploded view of the inverted roller assembly and supporting frame member;

FIG. 4 is a sectional view taken through the inverted assembled roller assembly and frame member;

FIG. 5 is a fragmentary perspective view of an inverted roller assembly mounted midway along the frame member; and FIG. 6 is an end elevational view of the frame member defining the integral screw bosses.

DETAILED DESCRIPTION OF THE PREFERRED EMBODIMENT

Figure 1:
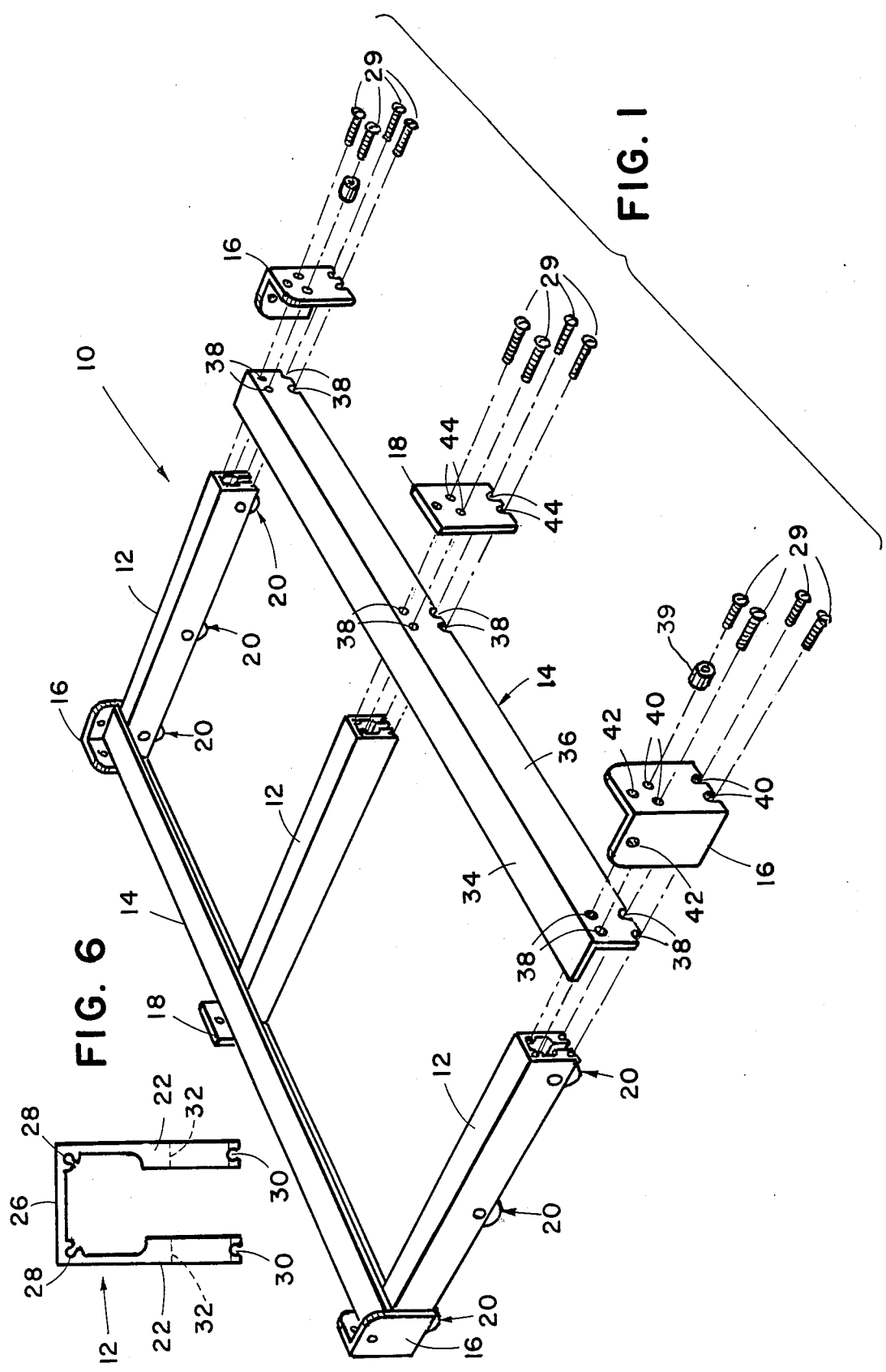
FIG. 1 is a perspective view, partially exploded, of the mobile shelving carriage.

A mobile shelving carriage constructed in accordance with a preferred aspect of the invention is illustrated in FIG. 1 and generally designated 10. The carriage includes a plurality of cross members 12, a pair of opposite side rails 14, corner connectors 16, intermediate connectors 18, and roller assemblies 20. The cross members 12 and side rails 14 are interconnected to form a rectangular frame with appropriate cross bracing. The corner connectors 16 and intermediate connectors 18 are used at the interconnections for enhanced strength. The roller assemblies 20 are mounted within the cross members 12 and are retained in position at the corners by the screws used to interconnect the cross members and side rails.

Cross member 12 is extruded aluminum and therefore defines a generally uniform cross sectional shape throughout its length (see FIG. 6). The cross member generally includes a pair of side walls 22 and 24 interconnected by a top web 26. A pair of integral upper screw bosses 28 are formed at the junction of the top web 26 with each of the side walls 22 and 24. The diameter of each of the screw bosses 28 is selected to accommodate a 10-32 screw. At the lower terminal ends of each of the side walls 22, a lower screw boss 30 is defined which is also dimensioned to receive a 10-32 screw. The screw bosses 30 open downwardly through the lower edge of both legs and are generally horseshoe-shaped to insure that the screws are retained therein and do not fall downwardly out of the bosses. An axle-receiving bore or aperture 32 is drilled or formed through both of side legs 22. The axle bore 32 intersects the screw bosses 30 so that a screw located within the boss will also extend partially into the holes 32.

The side rails 14 are also extruded aluminum and are a simple L-shape throughout their length including a top flange 34 and a bottom flange 36. Four screw holes 38 are formed in the side flange 36 so as to be aligned with the screw bosses 28 and 30 in the cross members 12. Consequently, screws 29 can be inserted through holes 38 to be secured in the bosses 28 and 30. A Lavelle recess bumper 39 is mounted on at least one of the screws at each corner to provide shock absorption between carriages in the shelving system.

Corner brackets 16 are also L-shaped in cross section and can be cut from the same stock from which side rails 14 are fabricated. A plurality of screw holes 40 are formed in the corner bracket 16 so as to be aligned with the screw holes 38 in the side rail 14. Each of the corner brackets 16 is higher than the associated side rail 14 to aid in positioning and retaining a shelving unit (not shown) on the carriage 10. Optionally, screw holes 42 can be provided in the corner bracket to facilitate intersecurement of the bracket to a shelving unit supported on the carriage 10.

Intermediate brackets 18 also define a plurality of screw holes 44 which are aligned with the screw holes 38 in the side rail 14 in the assembled unit. The intermediate brackets 18 also extend upwardly beyond the associated side rail 14 to facilitate positioning and retention of a shelving unit on the carriage 10.

The foller assembly 20 (FIGS. 3 and 4) rotatably supports the carriage on tracks (not shown) mounted on the floor. The assembly includes an axle 46, a bushing 48, and a roller 50. The axle 46 is fabricated of 12-L-14 steel which is a free-cutting steel which can be turned on a screw machine. The axle 46 includes a semi-circular circumferential groove or opening 52 at each of its opposite ends. As best illustrated in FIG. 4, the grooves 52 are aligned with the screw bosses 30 when the axle is properly positioned within the cross member 12. The bushing 48 is that sold under the trademark OIL-LITE by Sintered Metal Company (Sinco) of Sikesville, Pa. Bearing 50 is also generally well known to those having ordinary skill in the art and in the preferred embodiment is that sold as Model No. 6203-2BS by SKS Corporation of Cleveland, Ohio. The busing 48 is fitted about and closely received on the axle 46; and the bearing 50 is fitted about and closely received on the bushing 48. The length of the bushing 48 is approximately equal to the interior distance between the side walls 22 (see FIG. 4). The width of the bearing 50 is substantially less than the interior distance between the side walls 22 so that the bearing 50 is free to axially travel along or float on the bushing 48 as is conventional in the art to follow tracks which may not be perfectly straight.

As perhaps best illustrated in FIG. 4, the screws 29 within the lower bosses 30 secure the axle 46 in position. Specifically, the screws 29 interfit with the grooves 52 so that the screws 29 are generally tangential to the axle 46. Consequently, the axle cannot shift laterally out of cross member 12 or within the holes 32. This construction greatly facilitates the fabrication of the carriage with a minimum of parts.

A bearing assembly 20 mounted midway along the cross member 12 is illustrated in FIG. 5. The screws 29 do not extend to this position on the cross member 12; and accordingly alternative means are used to secure the roller axle 46 in position. Specifically, roll pins 54 of three-sixteenths inch diameter are slid into the screw bosses 30 prior to the intersecurement of the cross members 12 and the side rails 14. After the roll pins are slid to the appropriate position as illustrated in FIG. 5, the cross member 12 is clinched or otherwise deformed at positions 56 to retain the roll pin in position. The roll pins 54 interfit with the grooves 52 on the axle 46 in a manner similar to that of screws 29 to retain the axle in position.

The present invention provides a mobile shelving carriage fabricated from a minimum of parts. Only two differently shaped extrusions are required to assemble the entire carriage frame. Since one of the extrusions defines integral bosses, the screws used to interconnect the frame members do not require any other attachment means. The interconnecting screws interfit with the roller axles to retain the roller assemblies in position. Consequently, the screws serve two functions to further enhance the simplicity of the construction.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

We claim:

1. A mobile shelving carriage comprising:
   a first frame member defining axle aperture means for receiving an axle and boss aperture means for receiving an elongated fastener, said boss aperture means at least partially intersecting with and being substantially tangentially orthogonal to said axle aperture means;
   an axle within said axle aperture means, said axle defining at least one alignment opening aligned with said boss aperture means;
   a roller means on said axle for rotatably engaging a support surface;
   a second frame member; and
   an elongated fastener for securing said second frame member to said first frame member and for retaining said axle within said first frame member, said fastener extending through said second frame member and secured with respect to said boss aperture means and interfitting with said alignment opening in said axle to both intersecure said frame members and secure said axle longitudinally with respect to said first frame member.

2. A mobile shelving carriage as defined in claim 1 wherein said first frame member has a generally uniform cross section throughout its length.

3. A mobile shelving carriage as defined in claim 1 wherein said alignment opening comprises a groove in the outer surface of said axle.

4. A mobile shelving carriage as defined in claim 3 wherein said groove is a circumferential groove to facilitate interfitting of said fasteners with said froove.

5. A mobile shelving carriage comprising:
   a first one-piece frame member defining an integral screw boss;
   an axle supported by said first frame member and defining a opening aligned with said screw boss, said axle being tangentially orthogonal to said screw boss;
   a second frame member defining a screw-receiving opening aligned with said screw boss; and
   a screw extending through said in said second member and secured within said boss in said first member to intersecure saiad frame members, said screw interfitting with said opening in said axle to retain said axle within said first frame member.

6. A mobile shelving carriage as defined in claim 5 wherein said first frame member has a generally uniform cross-sectional shape throughout its length.

7. A mobile shelving carriage as defined in claim 5 wherein said opening comprises an external groove.

8. A mobile shelving carriage as defined in claim 7 wherein said external groove comprises a circumferential groove.

* * * * *

UNITED STATES PATENT AND TRADEMARK OFFICE
CERTIFICATE OF CORRECTION

PATENT NO. : 4,771,901

DATED : September 20, 1988

INVENTOR(S) : Kenneth D. Griswold and Alan R. Leist

It is certified that error appears in the above-identified patent and that said Letters Patent is hereby corrected as shown below:

Column 2, Line 65
   "foller" should be --roller--.
Column 4, Claim 4, Line 34
   "troove" should be --groove--.
Column 4, Claim 5, Line 45
   After "said" (first occurrence) insert --opening--.
Column 4, Claim 5, Line 47
   "saiad" should be --said--.

Signed and Sealed this

Second Day of May, 1989

Attest:

DONALD J. QUIGG

Attesting Officer

Commissioner of Patents and Trademarks